United States Patent
Hayama

(10) Patent No.: US 11,654,395 B2
(45) Date of Patent: *May 23, 2023

(54) OXIDATION CATALYST FOR A DIESEL ENGINE EXHAUST

(71) Applicant: JOHNSON MATTHEY JAPAN GODO KAISHA, Sakura Tochigi (JP)

(72) Inventor: Tomoharu Hayama, Sakura Tochigi (JP)

(73) Assignee: Johnson Matthey Japan Godo Kaisha, Sakura Tochigi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/225,652

(22) Filed: Dec. 19, 2018

(65) Prior Publication Data

US 2019/0201844 A1    Jul. 4, 2019

(51) Int. Cl.
*B01D 53/94*   (2006.01)
*B01J 23/89*   (2006.01)
(Continued)

(52) U.S. Cl.
CPC ....... *B01D 53/944* (2013.01); *B01D 53/9468* (2013.01); *B01D 53/9472* (2013.01); *B01J 20/16* (2013.01); *B01J 21/04* (2013.01); *B01J 21/066* (2013.01); *B01J 21/08* (2013.01); *B01J 21/12* (2013.01); *B01J 23/6562* (2013.01); *B01J 23/8973* (2013.01); *B01J 29/068* (2013.01); *B01J 35/0006* (2013.01); *B01J 35/04* (2013.01); *B01J 37/0215* (2013.01); *B01J 37/0236* (2013.01); *B01J 37/0244* (2013.01); *B01J 37/0246* (2013.01); *B01J 37/0248* (2013.01);
(Continued)

(58) Field of Classification Search
CPC ... B01J 21/04; B01J 21/08; B01J 21/12; B01J 20/16; B01J 23/42; B01J 23/44; B01J 23/6447; B01J 23/745; B01J 23/8973; B01D 53/944; F01N 3/0814; F01N 3/0842; F01N 3/103; F01N 2510/063
See application file for complete search history.

(56) References Cited

U.S. PATENT DOCUMENTS 4,380,664 A    4/1983 Ishii
5,478,528 A    12/1995 Golunski
(Continued)

FOREIGN PATENT DOCUMENTS

GB    1286443 A    8/1972
GB    1328058 A    8/1973
(Continued)

*Primary Examiner* — Jun Li

(57) ABSTRACT

An oxidation catalyst for treating an exhaust gas produced by a diesel engine comprises a catalytic region and a substrate, wherein the catalytic region comprises a catalytic material comprising: bismuth (Bi) or an oxide thereof; a Group 8 metal or an oxide thereof; a platinum group metal (PGM) selected from the group consisting of (i) platinum (Pt), (ii) palladium (Pd) and (iii) platinum (Pt) and palladium (Pd); and a support material, which comprises alumina, silica, a mixed oxide of alumina and a refractory oxide, a mixed oxide of silica and a refractory oxide, a composite oxide of alumina and a refractory oxide, a composite oxide of silica and a refractory oxide, alumina doped with a refractory oxide or silica doped with a refractory oxide.

17 Claims, 2 Drawing Sheets

(51) Int. Cl.

| | |
|---|---|
| *B01J 35/04* | (2006.01) |
| *B01J 37/08* | (2006.01) |
| *B01J 21/12* | (2006.01) |
| *B01J 37/02* | (2006.01) |
| *B01J 21/04* | (2006.01) |
| *B01J 21/08* | (2006.01) |
| *F01N 3/10* | (2006.01) |
| *B01J 20/16* | (2006.01) |
| *B01J 21/06* | (2006.01) |
| *B01J 23/656* | (2006.01) |
| *B01J 29/068* | (2006.01) |
| *B01J 35/00* | (2006.01) |
| *F01N 3/28* | (2006.01) |
| *F01N 3/08* | (2006.01) |

(52) U.S. Cl.
CPC .............. *B01J 37/08* (2013.01); *F01N 3/103* (2013.01); *F01N 3/28* (2013.01); *B01D 2255/1021* (2013.01); *B01D 2255/1023* (2013.01); *B01D 2255/2073* (2013.01); *B01D 2255/2092* (2013.01); *B01D 2255/2096* (2013.01); *B01D 2255/20738* (2013.01); *B01D 2255/902* (2013.01); *B01D 2255/903* (2013.01); *B01D 2255/9022* (2013.01); *B01D 2255/9032* (2013.01); *B01D 2255/91* (2013.01); *B01D 2255/9155* (2013.01); *B01D 2258/012* (2013.01); *B01J 2523/00* (2013.01); *F01N 3/0814* (2013.01); *F01N 3/0842* (2013.01); *F01N 2330/06* (2013.01); *F01N 2370/02* (2013.01); *F01N 2510/063* (2013.01); *F01N 2510/0682* (2013.01); *F01N 2510/0684* (2013.01)

(56) References Cited

U.S. PATENT DOCUMENTS

| | | |
|---|---|---|
| 5,849,256 A | 12/1998 | Deeba |
| 6,025,297 A * | 2/2000 | Ogura ................ B01J 23/42 502/344 |
| 2007/0134145 A1* | 6/2007 | Strehlau ............. B01J 29/072 423/213.5 |
| 2008/0003155 A1* | 1/2008 | Jia ..................... B01J 23/6447 423/213.5 |
| 2008/0124514 A1 | 5/2008 | Fujdala |
| 2009/0082199 A1* | 3/2009 | Suzuki ................ B01J 23/6447 502/326 |
| 2011/0071019 A1* | 3/2011 | Hanaki ............... B01J 37/0205 502/304 |
| 2011/0271664 A1* | 11/2011 | Boorse ................ F01N 13/0097 422/171 |
| 2014/0256543 A1* | 9/2014 | Khosravi-Mardkhe ................ C01F 7/441 502/439 |
| 2015/0176455 A1* | 6/2015 | Chandler ............ B01J 23/40 60/286 |
| 2015/0224478 A1* | 8/2015 | Bergeal ............. B01D 53/9472 423/213.5 |
| 2016/0346731 A1* | 12/2016 | Umeno ............... B01D 53/945 |
| 2017/0064498 A1 | 3/2017 | Manges |
| 2017/0106337 A1* | 4/2017 | Chiffey ............. B01J 37/0234 |
| 2018/0056239 A1* | 3/2018 | Feaviour ............ B01J 23/6445 |

FOREIGN PATENT DOCUMENTS

| | | |
|---|---|---|
| JP | 05038435 | 2/1993 |
| WO | 9947260 A1 | 9/1999 |
| WO | 2007077462 A1 | 7/2007 |
| WO | 2011080525 | 7/2011 |
| WO | 2015017436 A1 | 2/2015 |
| WO | 2017060694 A1 | 4/2017 |

* cited by examiner

OXIDATION CATALYST FOR A DIESEL ENGINE EXHAUST

CROSS-REFERENCE TO RELATED APPLICATIONS

This application claims priority benefit to Great Britain Patent Application No. 1721527.8, filed on Dec. 17, 2017, which is incorporated herein by reference.

FIELD OF THE INVENTION

The invention relates to an oxidation catalyst and an exhaust system for treating an exhaust gas produced by a diesel engine. The invention further relates to a vehicle comprising the oxidation catalyst or the exhaust system.

BACKGROUND TO THE INVENTION

Generally, there are four classes of pollutant that are legislated against by inter-governmental organisations throughout the world: carbon monoxide (CO), unburned hydrocarbons (HCs), oxides of nitrogen ($NO_x$) and particulate matter (PM). As emissions standards for permissible emission of pollutants in exhaust gases from vehicular engines become progressively tightened, there is a need to provide improved catalysts that are able to meet these standards and which are cost-effective.

For diesel engines, an oxidation catalyst (often referred to as a diesel oxidation catalyst (DOC)) is typically used to treat the exhaust gas produced by such engines. Diesel oxidation catalysts generally catalyse the oxidation of (1) carbon monoxide (CO) to carbon dioxide ($CO_2$), and (2) HCs to carbon dioxide ($CO_2$) and water ($H_2O$). Exhaust gas temperatures for diesel engines, particularly for light-duty diesel vehicles, are relatively low (e.g. about 400° C.) and so one challenge is to develop durable catalyst formulations with low "light-off" temperatures.

The activity of oxidation catalysts, such as DOCs, is often measured in terms of its "light-off" temperature, which is the temperature at which the catalyst starts to perform a particular catalytic reaction or performs that reaction to a certain level. Normally, "light-off" temperatures are given in terms of a specific level of conversion of a reactant, such as conversion of carbon monoxide. Thus, a T50 temperature is often quoted as a "light-off" temperature because it represents the lowest temperature at which a catalyst catalyses the conversion of a reactant at 50% efficiency.

Exhaust systems for diesel engines may include several emissions control devices. Each emissions control device has a specialised function and is responsible for treating one or more classes of pollutant in the exhaust gas. The performance of an upstream emissions control device, such as an oxidation catalyst, can affect the performance of a downstream emissions control device. This is because the exhaust gas from the outlet of the upstream emissions control device is passed into the inlet of the downstream emissions control device. The interaction between each emissions control device in the exhaust system is important to the overall efficiency of the system.

JP H05-38435 discloses a catalyst composition consisting of perovskite composite oxide containing a rare-earth element, rare earth oxide, aluminium oxide, zirconium oxide, iron oxide and one or more component selected from bismuth oxide and noble metals.

SUMMARY OF THE INVENTION

The inventors have surprisingly found that a catalytic material comprising the combination of a bismuth component and a Group 8 metal component with a platinum group metal on a support material are highly active toward the oxidation of carbon monoxide (CO). Advantageously, the CO light off temperature for such a catalytic material is very low and excellent CO conversion can be obtained. The catalytic material may also have excellent hydrocarbon (HC) conversion activity.

The invention provides an oxidation catalyst for treating an exhaust gas produced by a diesel engine comprising a catalytic region and a substrate, wherein the catalytic region comprises a catalytic material comprising:
  bismuth (Bi) or an oxide thereof;
  a Group 8 metal or an oxide thereof;
  a platinum group metal (PGM) selected from the group consisting of (i) platinum (Pt), (ii) palladium (Pd) and (iii) platinum (Pt) and palladium (Pd); and
  a support material, which comprises alumina, silica, a mixed oxide of alumina and a refractory oxide, a mixed oxide of silica and a refractory oxide, a composite oxide of alumina and a refractory oxide, a composite oxide of silica and a refractory oxide, alumina doped with a refractory oxide or silica doped with a refractory oxide.

The term "Group 8 metal" as used herein refers to transition metals from Group 8 of the periodic table and includes the metals iron (Fe), ruthenium (Ru) and osmium (Os).

The invention also relates to an exhaust system for treating an exhaust gas produced by a diesel engine. The exhaust system comprises the oxidation catalyst of the invention and optionally an emissions control device.

The invention further provides a vehicle. The vehicle comprises a diesel engine and either an oxidation catalyst or an exhaust system of the invention.

The invention also relates to the use of an oxidation catalyst to treat an exhaust gas produced by a diesel engine. The oxidation catalyst is an oxidation catalyst in accordance with the invention.

Also provided by the invention is a method of treating an exhaust gas produced by a diesel engine. The method comprises the step of passing an exhaust gas produced by a diesel engine through an exhaust system comprising the oxidation catalyst of the invention.

In the use and method aspects of the invention, it is preferable that the exhaust gas is produced by a diesel engine run on fuel, preferably diesel fuel, comprising ≤50 ppm of sulfur, more preferably ≤15 ppm of sulfur, such as ≤10 ppm of sulfur, and even more preferably ≤5 ppm of sulfur.

BRIEF DESCRIPTION OF THE DRAWINGS

FIG. 1 shows an oxidation catalyst having a first catalytic layer (2) containing bismuth or an oxide thereof and a Group 8 metal or an oxide thereof. The first catalytic layer (2) is disposed on a second catalytic layer (3). The second catalytic layer (3) is disposed on the substrate (1).

FIG. 2 shows an oxidation catalyst having a first catalytic zone (2) containing bismuth or an oxide thereof and a Group 8 metal or an oxide thereof. There is also a second catalytic zone (3) disposed on the substrate (1).

FIG. 3 shows an oxidation catalyst having a first catalytic zone (2) containing bismuth or an oxide thereof and a Group 8 metal or an oxide thereof. The first catalytic zone (2) is disposed or supported on a second catalytic layer (3) at or near an inlet end of the substrate (1). The second catalytic layer (3) is disposed on the substrate (1).

FIG. 4 shows an oxidation catalyst having a first catalytic zone (2) containing bismuth or an oxide thereof and a Group 8 metal or an oxide thereof. The first catalytic zone (2) is disposed on both a substrate (1) and a second catalytic zone (3).

FIG. 5 shows an oxidation catalyst having a first catalytic layer (2) containing bismuth or an oxide thereof and a Group 8 metal or an oxide thereof. The first catalytic layer (2) is disposed on both a substrate (1) and a second catalytic zone (3).

DETAILED DESCRIPTION OF THE INVENTION

Figure 1:
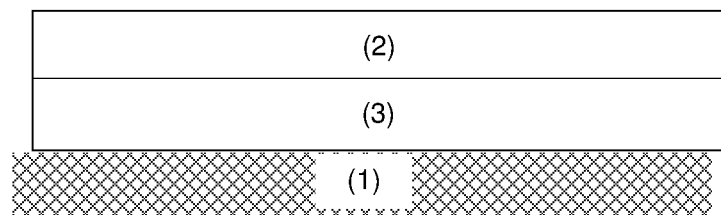
FIGS. 1 to 5 are schematic representations of examples of oxidation catalysts of the invention. In each of the Figures, the left-hand side represents an inlet end of the substrate and the right hand side represents an outlet end of the substrate.

The oxidation catalyst of the invention comprises a catalytic region. The catalytic region comprises, or consists essentially of, a catalytic material.

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques). Typically, the "region" has a uniform length. Each "region" has a uniform composition (i.e. there is no substantial difference in the composition of the washcoat when comparing one part of the region with another part of that region).

The expression "consists essentially of" as used herein limits the scope of a feature to include the specified materials, and any other materials or steps that do not materially affect the basic and novel characteristic(s) of that feature, such as for example minor impurities or of the claimed invention. The basic and novel characteristics of the present invention is a catalytic material including (a) bismuth or an oxide thereof, (b) a Group 8 metal or an oxide thereof, (c) a platinum group metal (PGM) selected from the group consisting of (i) platinum (Pt), (ii) palladium (Pd) and (iii) platinum (Pt) and palladium (Pd); and (d) a support material as defined herein which exhibit oxidation activity as illustrated by carbon monoxide oxidation in the exhaust gas of a compression ignition (or diesel) engine. The expression "consist essentially of" embraces the expression "consisting of".

The catalytic material may comprise, or consist essentially of, (a) bismuth or an oxide thereof, (b) a Group 8 metal or an oxide thereof, (c) a platinum group metal (PGM) selected from the group consisting of (i) platinum (Pt), (ii) palladium (Pd) and (iii) platinum (Pt) and palladium (Pd); and (d) a support material as defined herein.

The inclusion of both a bismuth promoter and a Group 8 metal promoter in an oxidation catalyst can provide enhanced oxidative activity toward carbon monoxide (CO) compared to an oxidation catalyst with a single bismuth or Group 8 metal promoter or an oxidation catalyst without a promoter. The enhanced oxidative activity toward carbon monoxide (CO) is demonstrated in the examples by a reduction in the light-off temperature for CO oxidation. The enhancement in CO oxidation activity may result from a synergy between the different promoters within the oxidation catalyst. The oxidation catalysts of the invention also have good hydrocarbon (HC) oxidation activity.

The bismuth or an oxide thereof is typically disposed directly onto or is directly supported on the support material.

The bismuth or an oxide thereof (e.g. particles of the bismuth or an oxide thereof) is typically supported on the support material, such as by being dispersed over a surface of the support material, more preferably by being dispersed over, fixed onto a surface of and/or impregnated within the support material.

The oxide of bismuth is typically bismuth (III) oxide ($Bi_2O_3$). It is preferred that the refractory oxide comprises an oxide of bismuth, preferably bismuth (III) oxide ($Bi_2O_3$).

In general, the catalytic material comprises an effective amount of bismuth or an oxide thereof to promote CO oxidation. The effective amount may or may not be sufficient to inhibit the oxidation of $SO_2$ to $SO_3$. It is, however, preferred that the diesel engine is run on a low sulfur containing diesel fuel. When a diesel engine is run on a low sulfur containing diesel fuel, the effect of bismuth or an oxide thereof on the oxidation of $SO_2$ to $SO_3$ is negligible.

The catalytic material also comprises a Group 8 metal or an oxide thereof. The Group 8 metal may be selected from the group consisting of iron (Fe), ruthenium (Ru) and a combination of two or more thereof. It is preferred that the Group 8 metal is iron (Fe).

It is generally preferred that the catalytic material comprises a single Group 8 metal or an oxide thereof.

The Group 8 metal or an oxide thereof (e.g. particles of the Group 8 metal or an oxide thereof) is typically disposed or supported on the support material. The Group 8 metal or an oxide thereof is disposed or supported on the support material by being dispersed over a surface of the support material, more preferably by being dispersed over and/or fixed onto a surface of the support material.

The Group 8 metal or an oxide thereof is typically disposed directly onto or is directly supported on the support material.

Typically, the support material is a particulate support material. The particulate support material generally comprises particles, wherein the D90 is ≤5.5 μm, the D50 is ≤3.0 μm and the D10 is ≤1.5 μm. The D50 is typically 0.5 to 3.0 μm. Particle size measurements can be obtained by Laser Diffraction Particle Size Analysis, such as by using a Malvern Mastersizer 2000, which is a volume-based technique (i.e. D(v, 0.1), D(v, 0.5) and D(v, 0.9) may also be referred to as DV10, DV50 and DV90 respectively (or D10, D50 and D90 respectively) and applies a mathematical Mie theory model to determine a particle size distribution.

Each of (a) the bismuth or an oxide thereof and (b) the Group 8 metal or an oxide thereof, is typically dispersed over a surface of the particulate support material (e.g. supported on the support material) and/or a surface of the platinum group metal (PGM). It is preferred that (a) the bismuth or an oxide thereof is dispersed over a surface of the particulate support material and/or a surface of the platinum group metal (PGM) and (b) the Group 8 metal or an oxide thereof is dispersed over a surface of the particulate support material.

The catalytic material typically comprises a total loading of bismuth of 1 to 100 g $ft^{-3}$, such as 5 to 75 g $ft^{-3}$, preferably 7.5 to 60 g $ft^{-3}$, more preferably 10 to 50 g $ft^{-3}$, even more preferably 15 to 40 g $ft^{-3}$. The inclusion of large amounts of bismuth can have detrimental effect on the catalytic region's oxidative activity toward hydrocarbons.

The loading refers to the amount of bismuth that is present, which may be in an elemental form or as part of a compound, such as an oxide.

Typically, the catalytic material comprises bismuth in an amount of 0.1 to 5.0% by weight (e.g. of the support material), preferably 0.2 to 3.0% by weight (e.g. 0.5 to 2.5% by weight), more preferably 0.75 to 1.75% by weight, and even more preferably 1.0 to 1.5% by weight. These ranges refer to the amount of bismuth (even if present as part of a compound, such as an oxide) in relation to the amount of the support material. As mentioned above, the relative proportion of bismuth to the support material can affect the oxidative activity of the catalytic material toward hydrocarbons.

The catalytic material typically comprises a total loading of a Group 8 metal of 1 to 100 g ft$^{-3}$, such as 5 to 75 g ft$^{-3}$, preferably 7.5 to 60 g ft$^{-3}$, more preferably 10 to 50 g ft$^{-3}$, even more preferably 15 to 40 g ft$^{-3}$. The loading refers to the amount of Group 8 metal that is present, which may be in an elemental form or as part of a compound, such as an oxide.

Typically, the catalytic material comprises a Group 8 metal in a total amount of 0.1 to 5.0% by weight (e.g. of the support material), preferably 0.2 to 3.0% by weight (e.g. 0.5 to 2.5% by weight), more preferably 0.75 to 1.75% by weight, and even more preferably 1.0 to 1.5% by weight. These ranges refer to the amount of Group 8 metal (even if present as part of a compound, such as an oxide) in relation to the amount of the support material. The relative proportion of the Group 8 metal to the support material can affect the oxidative activity of the catalytic material toward hydrocarbons.

Typically, the catalytic material comprises a ratio by weight of bismuth to Group 8 metal (i.e. total Group 8 metal) of 5:1 to 1:5, preferably 2.5:1 to 1:2.5, more preferably 2:1 to 1:2, such as 1.5:1 to 1:1.5.

The support material comprises, or consists essentially of, alumina, silica, a mixed oxide of alumina and a refractory oxide, a mixed oxide of silica and a refractory oxide, a composite oxide of alumina and a refractory oxide, a composite oxide of silica and a refractory oxide, alumina doped with a refractory oxide or silica doped with a refractory oxide. For the avoidance of doubt, when the support material comprises (a) alumina, then the refractory oxide is not alumina and (b) silica, then the refractory oxide is not silica.

The term "mixed oxide" as used herein generally refers to a mixture of oxides in a single phase. This is the conventional meaning of this term in the art.

The term "composite oxide" as used herein generally refers to a composition of oxides having more than one phase. This is also the conventional meaning of this in the art.

The refractory oxide is typically selected from the group consisting of silica, titania and ceria. Alternatively, the refractory oxide can be zirconia.

It is to be understood that the expression "doped with a refractory oxide" as used herein generally refers to either alumina or silica where the bulk or host lattice of the alumina or silica is substitution doped or interstitially doped with a dopant. In some instances, small amounts of the dopant may be present at a surface of the alumina or silica. However, most of the dopant will generally be present in the body of the alumina or silica. The chemical and/or physical properties of alumina or silica are often affected by the presence of a dopant.

In general, when the support material comprises, or consists essentially of, (i) a mixed oxide of alumina or silica and a refractory oxide or (ii) a composite oxide of alumina or silica and a refractory oxide, then preferably the support material comprises 1 to 50% by weight of the refractory oxide (e.g. 50 to 99% by weight of alumina or silica), preferably 5 to 40% by weight of the refractory oxide (e.g. 60 to 95% by weight of alumina or silica), and more preferably 10 to 30% by weight of the refractory oxide (e.g. 70 to 90% by weight of alumina or silica).

When the support material comprises, or consists essentially of, alumina doped with a refractory oxide or silica doped with a refractory oxide, then preferably the support material comprises the alumina or silica dioxide doped with the refractory oxide in a total amount of 0.1 to 35% by weight (i.e. % by weight of the alumina or silica), preferably 0.5 to 30% by weight, more preferably 1.0 to 25% by weight, particularly 2.5 to 20% by weight, even more preferably 5.0 to 15% by weight. The % by weight of the refractory oxide is given with reference to the weight of the alumina or silica.

It is preferred that the support material comprises, or consists essentially of, alumina, a mixed oxide of alumina and a refractory oxide, a composite oxide of alumina and a refractory oxide, or alumina doped with a refractory oxide. More preferably, the support material comprises, or consists essentially of, alumina or alumina doped with a refractory oxide. Even more preferably, the support material comprises, or consists essentially of, alumina doped with a refractory oxide. The refractory oxide is preferably silica.

When the support material comprises alumina doped with silica, then preferably the support material comprises alumina doped with silica in a total amount of 0.5 to 15% by weight (i.e. % by weight of the alumina), preferably 1.0 to 10% by weight, more preferably 2.5 to 7.5% by weight.

The catalytic material comprises a platinum group metal (PGM) disposed or supported on the support material. The PGM may be disposed directly onto or is directly supported on the support material (e.g. there is no intervening material between the PGM and the support material).

Typically, the PGM is dispersed on the support material (e.g. particles of the PGM are dispersed over the surface of the particulate refractory oxide). The PGM is preferably not in the pores of the support material and/or the support material is not impregnated with the PGM.

The platinum group metal (PGM) is selected from the group consisting of (i) platinum (Pt), (ii) palladium (Pd) and (iii) platinum (Pt) and palladium (Pd). The platinum group metal (PGM) may be present in the catalytic material in metallic form or an oxide thereof.

Typically, the platinum group metal (PGM) is the only platinum group metal (PGM) present in the catalytic material (i.e. no other platinum group metals may be present in the catalytic material, except for the specified platinum group metals). The platinum group metal (PGM) as defined herein may be the only noble metal present in the catalytic material. For the avoidance of doubt, the term "noble metal" as used herein includes ruthenium (Ru), rhodium (Rh), palladium (Pd), silver (Ag), osmium (Os), iridium (Ir), platinum (Pt) and gold (Au).

The catalytic material may comprise platinum and palladium (i.e. the platinum group metal (PGM) is platinum and palladium). Both the platinum and the palladium are disposed or supported on the support material. Particles of platinum and palladium may be dispersed over a surface of the particulate refractory oxide.

The platinum and palladium may be in the form of an alloy, preferably a bimetallic alloy. Thus, the platinum group metal (PGM) may therefore comprise, or consist essentially of, an alloy of platinum and palladium.

When the catalytic material comprises platinum and palladium, then typically the ratio by weight of platinum to palladium is 20:1 to 1:20 (e.g. 15:1 to 1:15), preferably 10:1 to 1:10 (e.g. 7.5:1 to 1:7.5), more preferably 5:1 to 1:5 (e.g. 3:1 to 1:3).

It may be preferable that the ratio by weight of platinum to palladium is ≤1:1, particularly >1:1.

Typically, the ratio by weight of platinum to palladium is 20:1 to 1:1, preferably 15:1 to 1.5:1, particularly 10:1 to 2:1, and still more preferably 7.5:1 to 2.5:1.

A low CO light off temperature (T50) can be obtained when the catalytic material contains both platinum and palladium in combination with bismuth and a Group 8 metal on a support material, and where the catalytic material is relatively platinum rich. The addition of a relatively small amount of Pd may enhance the hydrocarbon (HC) and/or nitric oxide (NO) oxidation performance of the catalytic material, and improve the thermal stability of the catalytic material.

It is preferred that the platinum group metal (PGM) is selected from the group consisting of (i) platinum (Pt) and (ii) platinum (Pt) and palladium (Pd). More preferably, the platinum group metal (PGM) is platinum.

The catalytic material may comprise platinum as the only platinum group metal (PGM) and/or the only noble metal.

Surprisingly, it has been found that the presence of bismuth or an oxide thereof, a Group 8 metal or an oxide thereof and platinum when used in combination with a support material can result in a catalytic material having excellent CO oxidation. The CO light off temperature of a catalytic material comprising Pt as the only PGM may be lower than some catalytic materials containing both Pt and Pd (e.g. in a weight ratio of 2:1).

In general, the catalytic material may comprise a ratio by weight of the platinum group metal (PGM) to bismuth (Bi) of 10:1 to 1:10, preferably 5:1 to 1:5, more preferably 2.5:1 to 1:2.5. The relative proportion of PGM to bismuth can affect the oxidative activity of the catalytic material toward hydrocarbons. These ratios by weight are particularly preferable when the platinum group metal (PGM) comprises platinum, more preferably the PGM is platinum.

It is preferred that the catalytic material comprises a ratio by weight of the platinum group metal (PGM) to bismuth (Bi) of 10:1 to 1:2, more preferably 7.5:1 to 1:1, such as 5:1 to 1.5:1. These ratios by weight are particularly preferable when the platinum group metal (PGM) is platinum.

The catalytic region may further comprise a hydrocarbon adsorbent material. The hydrocarbon adsorbent material may be a zeolite.

The zeolite may be a small pore zeolite (e.g. a zeolite having a maximum ring size of eight tetrahedral atoms), a medium pore zeolite (e.g. a zeolite having a maximum ring size of ten tetrahedral atoms) or a large pore zeolite (e.g. a zeolite having a maximum ring size of twelve tetrahedral atoms). It is preferred that the zeolite is a medium pore zeolite (e.g. a zeolite having a maximum ring size of ten tetrahedral atoms) or a large pore zeolite (e.g. a zeolite having a maximum ring size of twelve tetrahedral atoms).

Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite.

When the catalytic region comprises a hydrocarbon adsorbent, the total amount of hydrocarbon adsorbent is 0.05 to 3.00 g in$^{-3}$, particularly 0.10 to 2.00 g in$^{-3}$, more particularly 0.2 to 1.0 g in$^{-3}$. For example, the total amount of hydrocarbon adsorbent may be 0.8 to 1.75 g in$^{-3}$, such as 1.0 to 1.5 g in$^{-3}$.

Typically, the catalytic region is substantially free of manganese. More preferably, the catalytic region does not comprise manganese.

Generally, the expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise".

The catalytic region is preferably substantially free of rhodium and/or a $NO_x$ storage component comprising, or consisting essentially of, of an alkali metal, alkaline earth metal and/or a rare earth metal (e.g. an oxide, a carbonate or a hydroxide). More preferably, the catalytic region does not comprise rhodium and/or a $NO_x$ storage component comprising, or consisting essentially of, an alkali metal, an alkaline earth metal and/or a rare earth metal (e.g. an oxide, a carbonate or a hydroxide).

The catalytic region typically has a total loading of the PGM of 5 to 300 g ft$^{-3}$. It is preferred that the catalytic region has a total loading of the PGM of 10 to 250 g ft$^{-3}$ (e.g. 75 to 175 g ft$^{-3}$), more preferably 15 to 200 g ft$^{-3}$ (e.g. 50 to 150 g ft$^{-3}$), still more preferably 20 to 150 g ft$^{-3}$.

Generally, the catalytic region comprises a total amount of the support material of 0.1 to 3.0 g in$^{-3}$, preferably 0.2 to 2.5 g in$^{-3}$, still more preferably 0.3 to 2.0 g in$^{-3}$, and even more preferably 0.5 to 1.75 g in$^{-3}$.

The catalytic region may be disposed or supported on the substrate. It is preferred that the catalytic region is directly disposed or directly supported on the substrate (i.e. the region is in direct contact with a surface of the substrate).

The oxidation catalyst may comprise a single catalytic region. The catalytic region may be a catalytic layer (e.g. a single catalytic layer).

Alternatively, the oxidation catalyst may further comprise a second catalytic region, such as a second catalytic region described below. The catalytic region described above (i.e. the catalytic region comprising bismuth and a Group 8 metal) is referred to below as the first catalytic region.

Thus, the oxidation catalyst comprises a first catalytic region and a second catalytic region. For the avoidance of doubt, the first catalytic region is different (i.e. different composition) to the second catalytic region. It is preferred that the second catalytic region does not comprise bismuth and/or a Group 8 metal.

In a first arrangement, the first catalytic region is a first catalytic layer and the second catalytic region is a second catalytic layer. The first catalytic layer may be disposed or supported (e.g. directly disposed or supported) on the second catalytic layer. When the first catalytic layer is disposed on the second catalytic layer, it is preferred that the first catalytic layer is the uppermost layer of the oxidation catalyst (i.e. the first catalytic layer has a surface that is exposed to the exhaust gas as it passes through the oxidation catalyst). See, for example, FIG. 1.

Alternatively, in the first arrangement, the second catalytic layer may be disposed or supported (e.g. directly disposed or supported) on the first catalytic layer. When the second catalytic layer is disposed on the first catalytic layer, it is preferred that the second catalytic layer is the uppermost layer of the oxidation catalyst (i.e. the second catalytic layer has a surface that is exposed to the exhaust gas as it passes through the oxidation catalyst).

It is preferred that the first catalytic layer is disposed or supported (e.g. directly disposed or supported) on the second catalytic layer. It is advantageous for the first catalytic layer to be disposed on the second catalytic layer. The exhaust gas will then first come into contact with the first catalytic layer for oxidation of carbon monoxide. This will allow the second catalytic layer to oxidise any remaining pollutant components of the exhaust gas without competition from the carbon monoxide. As the first catalytic layer also has excellent low temperature CO oxidative activity, the heat generated from the oxidative reactions performed by this layer will assist in bringing the second catalytic layer up to its catalytically effective temperature.

When the first catalytic layer is disposed or supported (e.g. directly disposed or supported) on the second catalytic layer, then the second catalytic layer may be disposed or supported (e.g. directly disposed or supported) on the substrate or on a third catalytic region, preferably a third catalytic layer. It is preferred that the second catalytic layer may be disposed or supported (e.g. directly disposed or supported) on the substrate.

When the second catalytic layer is disposed or supported (e.g. directly disposed or supported) on the first catalytic layer, then the first catalytic layer may be disposed or supported (e.g. directly disposed or supported) on the substrate or on a third catalytic region, preferably a third catalytic layer. It is preferred that the first catalytic layer may be disposed or supported (e.g. directly disposed or supported) on the substrate.

The first catalytic layer typically extends for an entire length (i.e. substantially an entire length) of the substrate, particularly the entire length of the channels of a substrate monolith.

The second catalytic layer typically extends for an entire length (i.e. substantially an entire length) of the substrate, particularly the entire length of the channels of a substrate monolith.

In the first arrangement, when the oxidation catalyst comprises a third catalytic layer, then the third catalytic layer typically extends for an entire length (i.e. substantially an entire length) of the substrate, particularly the entire length of the channels of a substrate monolith.

Figure 2:
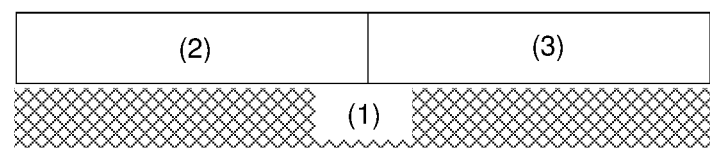

In a second arrangement, the first catalytic region is a first catalytic zone and the second catalytic region is a second catalytic zone. The first catalytic zone may be disposed upstream of the second catalytic zone. It is preferred that the first catalytic zone is the front most zone of the oxidation catalyst (i.e. the first catalytic zone has surfaces that are exposed to the exhaust gas as it enters the inlet end of the oxidation catalyst). See, for example, FIG. 2.

In general, the term "zone" as used herein refers to a "region" having a length that is less than the total length of the substrate, such as 75% of the total length of the substrate. A "zone" typically has a length (i.e. a substantially uniform length) of at least 5% (e.g. 5%) of the total length of the substrate. The total length of a substrate is the distance between its inlet end and its outlet end (e.g. the opposing ends of the substrate).

Alternatively, in the second arrangement, the second catalytic zone may be disposed upstream of the first catalytic zone. It is preferred that the second catalytic zone is the front most zone of the oxidation catalyst (i.e. the second catalytic zone has surfaces that are exposed to the exhaust gas as it enters the inlet end of the oxidation catalyst).

It is preferred that the first catalytic zone is disposed upstream of the second catalytic zone. It is advantageous for the first catalytic zone to be disposed upstream of the second catalytic zone. The exhaust gas will then first come into contact with the first catalytic zone for oxidation of carbon monoxide. This will allow the second catalytic zone to oxidise any remaining pollutant components of the exhaust gas without competition from the carbon monoxide. As the first catalytic zone also has excellent low temperature CO oxidative activity, the heat generated from the oxidative reactions performed by this zone will assist in bringing the second catalytic zone up to its catalytically effective temperature.

As a general feature of the second arrangement, the first catalytic zone may adjoin the second catalytic zone or there may be a gap (e.g. a space) between the first catalytic zone and the second catalytic zone. Preferably, the first catalytic zone is contact with the second catalytic zone. When the first catalytic zone adjoins and/or is in contact with the second catalytic zone, then the combination of the first catalytic zone and the second catalytic zone may be disposed or supported on the substrate as a layer (e.g. a single layer). Thus, a layer (e.g. a single) may be formed on the substrate when the first and second catalytic zones adjoin or are in contact with one another. Such an arrangement may avoid problems with back pressure.

The first catalytic zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

The second catalytic zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

Figure 6:
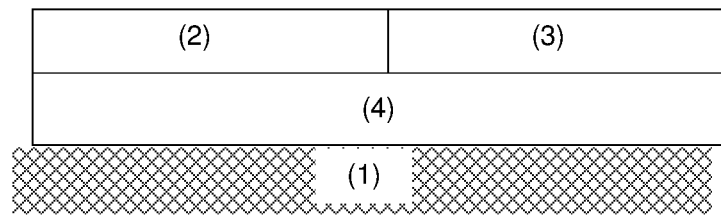
FIG. 6 shows an oxidation catalyst having a first catalytic zone (2) containing bismuth or an oxide thereof and a Group 8 metal or an oxide thereof. The first catalytic zone (2) and the second catalytic zone (3) are disposed on a third catalytic layer (4). The third catalytic layer (4) is disposed on a substrate (1).

The first catalytic zone and the second catalytic zone may be disposed or supported (e.g. directly disposed or supported) on the substrate. Alternatively, the first catalytic zone and the second catalytic zone may be disposed or supported (e.g. directly disposed or supported) on a third catalytic region, preferably a third catalytic layer. See, for example, FIG. 6.

In the second arrangement, when the oxidation catalyst comprises a third catalytic layer, then the third catalytic layer typically extends for an entire length (i.e. substantially an entire length) of the substrate, particularly the entire length of the channels of a substrate monolith.

In a third arrangement, the first catalytic region is disposed or supported (e.g. directly disposed or supported) on the second catalytic region.

The second catalytic region may be disposed or supported (e.g. directly disposed or supported) on the substrate. Alternatively, the second catalytic region may be disposed or supported (e.g. directly disposed or supported) on a third catalytic region, preferably a third catalytic layer. It is preferred that the second catalytic region is disposed or supported (e.g. directly disposed or supported) on the substrate.

An entire length (e.g. all) of the first catalytic region may be disposed or supported (e.g. directly disposed or supported) on the second catalytic region. When the first catalytic region is disposed on the second catalytic region, it is preferred that the first catalytic region is the uppermost region of the oxidation catalyst (i.e. the first catalytic region has a surface that is exposed to the exhaust gas as it passes through the oxidation catalyst). Additionally, it is preferred that the first catalytic region is a front most region of the oxidation catalyst (i.e. the first catalytic region has surfaces that are exposed to the exhaust gas as it enters the inlet end of the oxidation catalyst). See, for example, FIG. 3.

Alternatively, in the third arrangement, a part or portion of the length of the first catalytic region may be disposed or supported (e.g. directly disposed or supported) on the second catalytic region. A part or portion (e.g. the remaining part or portion) of the length of the first catalytic region may be disposed or supported (e.g. directly disposed or supported) on the substrate (see, for example, FIGS. 4 and 5) or a third catalytic region, preferably a third catalytic layer. When the first catalytic region is disposed on the second catalytic region, it is preferred that the first catalytic region is the uppermost and/or front most region of the oxidation catalyst (i.e. the first catalytic region has one or more surfaces that are exposed to the exhaust gas as it passes through the oxidation catalyst). The second catalytic region may be a second catalytic layer and the first catalytic region may be a first catalytic zone. The entire length of the first catalytic zone is preferably disposed or supported on the second catalytic layer (e.g. see FIG. 3). The second catalytic layer may be disposed or supported (e.g. directly disposed or supported) on the substrate or a third catalytic layer. It is preferred that the second catalytic layer is disposed or supported (e.g. directly disposed or supported) on the substrate.

The second catalytic layer typically extends for an entire length (i.e. substantially an entire length) of the substrate, particularly the entire length of the channels of a substrate monolith.

The first catalytic zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

Figure 3:
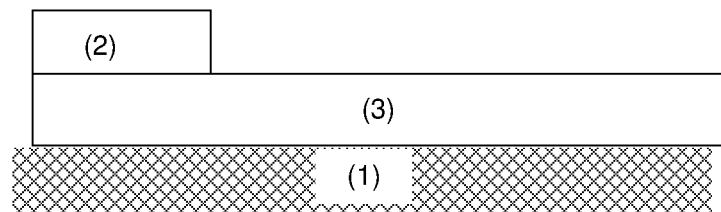

The first catalytic zone may be disposed at or near an inlet end of the substrate (e.g. as shown in FIG. 3). The first catalytic zone may be disposed at or near an outlet end of the substrate. It is preferred that the first catalytic zone is disposed at or near an inlet end of the substrate.

In an alternative third arrangement, the second catalytic region is a second catalytic zone and the first catalytic region is a first catalytic zone or a first catalytic layer. The first catalytic zone or the first catalytic layer is disposed or supported (e.g. directly disposed or supported) on the second catalytic zone. See, for example, FIGS. 4 and 5.

The second catalytic zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

An entire length (e.g. all) of the second catalytic zone may be disposed or supported (e.g. directly disposed or supported) on the substrate. Alternatively, an entire length (e.g. all) of the second catalytic zone may be disposed or supported (e.g. directly disposed or supported) on the third catalytic layer.

Figure 4:
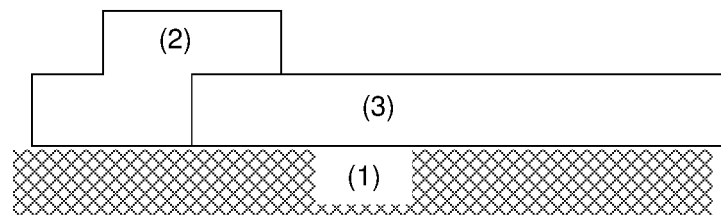
Figure 5:
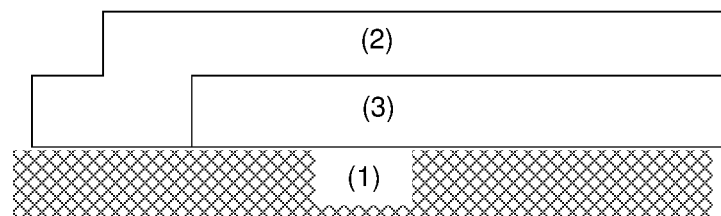

The second catalytic zone may be disposed at or near an outlet end of the substrate (e.g. as shown in FIGS. 4 and 5). The second catalytic zone may be disposed at or near an inlet end of the substrate. It is preferred that the second catalytic zone is disposed at or near an outlet end of the substrate.

In addition to being disposed or supported on the second catalytic zone, the first catalytic zone or the first catalytic layer may be disposed or supported (e.g. directly disposed or supported) on the substrate or a third catalytic layer, preferably the substrate. Thus, a part or portion of the length of the first catalytic zone or the first catalytic layer may be disposed or supported (e.g. directly disposed or supported) on the second catalytic zone and a part or portion (e.g. the remaining part or portion) of the length of the first catalytic zone or the first catalytic layer may be disposed or supported (e.g. directly disposed or supported) on the substrate or the third catalytic layer, preferably the substrate.

In the alternative third arrangement, when the first catalytic region is a first catalytic zone (e.g. as shown in FIG. 4), then the first catalytic zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

The first catalytic zone may be disposed at or near an inlet end of the substrate (e.g. as shown in FIG. 4). The first catalytic zone may be disposed at or near an outlet end of the substrate. It is preferred that the first catalytic zone is disposed at or near an outlet end of the substrate.

In the alternative third arrangement, when the first catalytic region is a first catalytic layer (e.g. as shown in FIG. 5), then the first catalytic layer typically extends for an entire length (i.e. substantially an entire length) of the substrate, particularly the entire length of the channels of a substrate monolith. When the first catalytic region is a first catalytic layer, then preferably the second catalytic zone is disposed at or near an outlet end of the substrate.

In a fourth arrangement, the second catalytic region is disposed or supported on the first catalytic region.

The first catalytic region may be disposed or supported (e.g. directly disposed or supported) on the substrate. Alternatively, the first catalytic region may be disposed or supported (e.g. directly disposed or supported) on a third catalytic region, preferably a third catalytic layer. It is preferred that the first catalytic region is disposed or supported (e.g. directly disposed or supported) on the substrate.

An entire length (e.g. all) of the second catalytic region may be disposed or supported (e.g. directly disposed or supported) on the first catalytic region. Alternatively, a part or portion of the length of the second catalytic region may be disposed or supported (e.g. directly disposed or supported) on the first catalytic region. A part or portion (e.g. the remaining part or portion) of the length of the second catalytic region may be disposed or supported (e.g. directly disposed or supported) on the substrate or a third catalytic region, preferably a third catalytic layer.

The first catalytic region may be a first catalytic layer and the second catalytic region may be a second catalytic zone. The entire length of the second catalytic zone is preferably disposed or supported on the first catalytic layer. The first catalytic layer may be disposed or supported (e.g. directly disposed or supported) on the substrate or a third catalytic layer. It is preferred that the first catalytic layer is disposed or supported (e.g. directly disposed or supported) on the substrate.

The first catalytic layer typically extends for an entire length (i.e. substantially an entire length) of the substrate, particularly the entire length of the channels of a substrate monolith.

The second catalytic zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

The second catalytic zone may be disposed at or near an inlet end of the substrate (e.g. as shown in FIG. 3). The second catalytic zone may be disposed at or near an outlet end of the substrate. It is preferred that the second catalytic zone is disposed at or near an outlet end of the substrate.

In an alternative fourth arrangement, the first catalytic region is a first catalytic zone and the second catalytic region is a second catalytic zone or a second catalytic layer. The second catalytic zone or the second catalytic layer is disposed or supported (e.g. directly disposed or supported) on the first catalytic zone.

The first catalytic zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

An entire length (e.g. all) of the first catalytic zone may be disposed or supported (e.g. directly disposed or supported) on the substrate. Alternatively, an entire length (e.g. all) of the first catalytic zone may be disposed or supported (e.g. directly disposed or supported) on the third catalytic layer.

The first catalytic zone may be disposed at or near an outlet end of the substrate. The first catalytic zone may be disposed at or near an inlet end of the substrate. It is preferred that the first catalytic zone is disposed at or near an inlet end of the substrate.

In addition to being disposed or supported on the first catalytic zone, the second catalytic zone or the second catalytic layer may be disposed or supported (e.g. directly disposed or supported) on the substrate or a third catalytic layer, preferably the substrate. Thus, a part or portion of the length of the second catalytic zone or the second catalytic layer may be disposed or supported (e.g. directly disposed or supported) on the first catalytic zone and a part or portion (e.g. the remaining part or portion) of the length of the second catalytic zone or the second catalytic layer may be disposed or supported (e.g. directly disposed or supported) on the substrate or the third catalytic layer, preferably the substrate.

In the alternative fourth arrangement, when the second catalytic region is a second catalytic zone, then the second catalytic zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

The second catalytic zone may be disposed at or near an inlet end of the substrate. The second catalytic zone may be disposed at or near an outlet end of the substrate. It is preferred that the second catalytic zone is disposed at or near an outlet end of the substrate.

In the alternative fourth arrangement, when the second catalytic region is a second catalytic layer, then the second catalytic layer typically extends for an entire length (i.e. substantially an entire length) of the substrate, particularly the entire length of the channels of a substrate monolith.

When the second catalytic region is a second catalytic layer, then preferably the first catalytic zone is disposed at or near an inlet end of the substrate.

As a general feature of the third arrangement or the fourth arrangement, when the oxidation catalyst comprises a third catalytic layer, the third catalytic layer typically extends for an entire length (i.e. substantially an entire length) of the substrate, particularly the entire length of the channels of a substrate monolith.

As a general feature of the oxidation catalyst, when the oxidation catalyst further comprises a third catalytic region, then the third catalytic region is different (i.e. different composition) to both the first catalytic region and the second catalytic region. It is preferred that each of the second catalytic region and the third catalytic region do not comprise bismuth.

In the first to fourth arrangements above, the second catalytic region, layer or zone may have DOC activity, PNA activity or LNT activity, as described below. When the oxidation catalyst comprises a third catalytic region layer or zone, it is preferred that (i) the second catalytic region, layer or zone has DOC activity and the third catalytic region, layer or zone has either PNA activity or LNT activity or (ii) the second catalytic region, layer or zone has either PNA activity or LNT activity and the third catalytic region, layer or zone has DOC activity. More preferably, the second catalytic region, layer or zone has DOC activity and the third catalytic region, layer or zone has either PNA activity or LNT activity. Even more preferably, the second catalytic region, layer or zone has DOC activity and the third catalytic region, layer or zone has PNA activity.

The regions, zones and layers described hereinabove may be prepared using conventional methods for making and applying washcoats onto a substrate are also known in the art (see, for example, our WO 99/47260, WO 2007/077462 and WO 2011/080525).

The second catalytic region may be formulated to provide the oxidation catalyst with additional functionality. The presence of the first catalytic region in combination with the second catalytic region may enhance the activity of the oxidation catalyst as whole or the activity of the second catalytic region. This enhancement in activity may result from a synergistic interaction between the first catalytic region and the second catalytic region. The low CO light off temperature of the first catalytic region may generate an exotherm that is able to rapidly bring the second catalytic region up to its light off temperature.

The second catalytic region may have $NO_x$ storage activity, such as lean $NO_x$ trap (LNT) activity or passive NON absorber (PNA) activity. Additionally, or alternatively, the second catalytic region may be for oxidising hydrocarbons (HCs) and/or nitric oxide (NO) in the exhaust gas produced by the diesel engine (e.g. the second catalytic region is a diesel oxidation catalytic region).

The second or third catalytic region may have PNA activity. A passive NON absorber (PNA) is able to store or absorb NON at relatively low exhaust gas temperatures (e.g. less than 200° C.), usually by adsorption, and release NON at higher temperatures. The NON storage and release mechanism of PNAs is thermally controlled, unlike that of LNTs which require a rich purge to release stored NON.

When the second or third catalytic region has NON storage activity (e.g. PNA activity), then the second or third catalytic region comprises, or consists essentially of, a molecular sieve catalyst comprising a noble metal and a molecular sieve, wherein the molecular sieve contains the noble metal.

The noble metal is typically selected from the group consisting of palladium (Pd), platinum (Pt) and rhodium (Rh). More preferably, the noble metal is selected from palladium (Pd), platinum (Pt) and a mixture thereof.

Generally, it is preferred that the noble metal comprises, or consists of, palladium (Pd) and optionally a second metal selected from the group consisting of platinum (Pt), rhodium (Rh), gold (Au), silver (Ag), iridium (Ir) and ruthenium (Ru). Preferably, the noble metal comprises, or consists of, palladium (Pd) and optionally a second metal selected from the group consisting of platinum (Pt) and rhodium (Rh). Even more preferably, the noble metal comprises, or consists of, palladium (Pd) and optionally platinum (Pt). More preferably, the molecular sieve catalyst comprises palladium as the only noble metal.

When the noble metal comprises, or consists of, palladium (Pd) and a second metal, then the ratio by mass of palladium (Pd) to the second metal is >1:1. More preferably, the ratio by mass of palladium (Pd) to the second metal is >1:1 and the molar ratio of palladium (Pd) to the second metal is >1:1.

The molecular sieve catalyst may be substantially free of, or does not comprise, a base metal, such as a base metal selected from the group consisting of iron (Fe), copper (Cu), manganese (Mn), chromium (Cr), cobalt (Co), nickel (Ni), zinc (Zn) and tin (Sn), as well as mixtures of two or more thereof.

It may be preferable that the molecular sieve catalyst is substantially free of, or does not comprise, barium (Ba), more preferably the molecular sieve catalyst is substantially free of an alkaline earth metal.

The molecular sieve is typically composed of aluminium, silicon, and/or phosphorus. The molecular sieve generally has a three-dimensional arrangement (e.g. framework) of $SiO_4$, $AlO_4$, and/or $PO_4$ that are joined by the sharing of oxygen atoms. The molecular sieve may have an anionic framework. The charge of the anionic framework may be counterbalanced by cations, such as by cations of alkali and/or alkaline earth elements (e.g., Na, K, Mg, Ca, Sr, and Ba), ammonium cations and/or protons.

Typically, the molecular sieve has an aluminosilicate framework, an aluminophosphate framework or a silico-aluminophosphate framework. The molecular sieve may have an aluminosilicate framework or an aluminophosphate framework. It is preferred that the molecular sieve has an aluminosilicate framework or a silico-aluminophosphate framework. More preferably, the molecular sieve has an aluminosilicate framework.

When the molecular sieve has an aluminosilicate framework, then the molecular sieve is preferably a zeolite.

The molecular sieve contains the noble metal. The molecular sieve is preferably an ion-exchanged molecular sieve that comprises a noble metal (i.e. the noble metal is ion-exchanged as a cation).

The molecular sieve catalyst generally has at least 1% by weight (i.e. of the amount of noble metal of the molecular sieve catalyst) of the noble metal located inside pores of the molecular sieve (e.g. by ion-exchange), preferably at least 5% by weight, more preferably at least 10% by weight, such as at least 25% by weight, even more preferably at least 50% by weight.

The molecular sieve may be selected from a small pore molecular sieve (i.e. a molecular sieve having a maximum ring size of eight tetrahedral atoms), a medium pore molecular sieve (i.e. a molecular sieve having a maximum ring size of ten tetrahedral atoms) and a large pore molecular sieve (i.e. a molecular sieve having a maximum ring size of twelve tetrahedral atoms). More preferably, the molecular sieve is selected from a small pore molecular sieve and a medium pore molecular sieve.

In a first molecular sieve catalyst embodiment, the molecular sieve is a small pore molecular sieve. The small pore molecular sieve preferably has a Framework Type selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG and ZON, as well as a mixture or intergrowth of any two or more thereof. The intergrowth is preferably selected from KFI-SIV, ITE-RTH, AEW-UEI, AEI-CHA, and AEI-SAV. More preferably, the small pore molecular sieve has a Framework Type that is AEI, CHA or an AEI-CHA intergrowth. Even more preferably, the small pore molecular sieve has a Framework Type that is AEI or CHA, particularly AEI.

Preferably, the small pore molecular sieve has an aluminosilicate framework or a silico-aluminophosphate framework. More preferably, the small pore molecular sieve has an aluminosilicate framework (i.e. the molecular sieve is a zeolite), especially when the small pore molecular sieve has a Framework Type that is AEI, CHA or an AEI-CHA intergrowth, particularly AEI or CHA.

In a second molecular sieve catalyst embodiment, the molecular sieve has a Framework Type selected from the group consisting of AEI, MFI, EMT, ERI, MOR, FER, BEA, FAU, CHA, LEV, MWW, CON and EUO, as well as mixtures of any two or more thereof.

In a third molecular sieve catalyst embodiment, the molecular sieve is a medium pore molecular sieve. The medium pore molecular sieve preferably has a Framework Type selected from the group consisting of MFI, FER, MWW and EUO, more preferably MFI.

In a fourth molecular sieve catalyst embodiment, the molecular sieve is a large pore molecular sieve. The large pore molecular sieve preferably has a Framework Type selected from the group consisting of CON, BEA, FAU, MOR and EMT, more preferably BEA.

In each of the first to fourth molecular sieve catalyst embodiments, the molecular sieve preferably has an aluminosilicate framework (e.g. the molecular sieve is a zeolite). Each of the aforementioned three-letter codes represents a framework type in accordance with the "IUPAC Commission on Zeolite Nomenclature" and/or the "Structure Commission of the International Zeolite Association".

The molecular sieve typically has a silica to alumina molar ratio (SAR) of 10 to 200 (e.g. 10 to 40), such as 10 to 100, more preferably 15 to 80 (e.g. 15 to 30). The SAR generally relates to a molecular having an aluminosilicate framework (e.g. a zeolite) or a silico-aluminophosphate framework, preferably an aluminosilicate framework (e.g. a zeolite).

The molecular sieve catalyst of the first molecular sieve catalyst embodiment has been found to have advantageous passive $NO_x$ adsorber (PNA) activity. The molecular sieve catalyst can be used to store $NO_x$ when exhaust gas temperatures are relatively cool, such as shortly after start-up of a lean burn engine. $NO_x$ storage by the molecular sieve catalyst occurs at low temperatures (e.g. less than 200° C.). As the lean burn engine warms up, the exhaust gas temperature increases and the temperature of the molecular sieve catalyst will also increase. The molecular sieve catalyst will release adsorbed $NO_x$ at these higher temperatures (e.g. 200° C. or above).

The second molecular sieve catalyst embodiment has cold start catalyst activity. Such activity can reduce emissions during the cold start period by adsorbing $NO_x$ and hydrocarbons (HCs) at relatively low exhaust gas temperatures (e.g. less than 200° C.). Adsorbed $NO_x$ and/or HCs can be released when the temperature of the molecular sieve catalyst is close to or above the effective temperature of the other catalyst components or emissions control devices for oxidising NO and/or HCs.

When the second or third catalytic region has PNA activity, then typically the second or third catalytic region comprises a total loading of noble metal of 1 to 250 g ft$^{-3}$, preferably 5 to 150 g ft$^{-3}$, more preferably 10 to 100 g ft$^{-3}$.

Alternatively, the second or third catalytic region may have LNT activity. During normal operation, a diesel engine produces an exhaust gas having a "lean" composition. An LNT comprises a $NO_x$ storage component that is able to store or trap nitrogen oxides ($NO_x$) from the exhaust gas by forming an inorganic nitrate. To release the $NO_x$ from the $NO_x$ storage component, such as when the $NO_x$ storage component is about to reach its storage capacity, the diesel engine may be run under rich conditions to produce an exhaust gas having a "rich" composition. Under these conditions, the inorganic nitrates of the $NO_x$ storage component decompose and form mainly nitrogen dioxide ($NO_2$) and some nitric oxide (NO). The LNT may contain a platinum group metal component that is able to catalytically reduce the released $NO_x$ to $N_2$ or $NH_3$ with hydrocarbons (HCs), carbon monoxide (CO) or hydrogen ($H_2$) present in the exhaust gas.

When the second or third catalytic region has $NO_x$ storage activity (e.g. LNT activity), then the second or third catalytic region comprises, or consists essentially of, a nitrogen oxides ($NO_x$) storage material. The nitrogen oxides ($NO_x$) storage material comprises, or consists essentially of, a nitrogen oxides ($NO_x$) storage component on a support material. It is preferred that the second catalytic region further comprises at least one platinum group metal (PGM). The at least one platinum group metal (PGM) may be provided by the $NO_x$ treatment material described herein below.

The $NO_x$ storage material comprises, or may consist essentially of, a $NO_x$ storage component and a support material. The $NO_x$ storage component may be supported on the support material and/or the support material may be doped with the $NO_x$ storage component.

The $NO_x$ storage component typically comprises an alkali metal, an alkaline earth metal and/or a rare earth metal. The $NO_x$ storage component generally comprises, or consists essentially of, (i) an oxide, a carbonate or a hydroxide of an alkali metal; (ii) an oxide, a carbonate or a hydroxide of an alkaline earth metal; and/or (iii) an oxide, a carbonate or a hydroxide of a rare earth metal.

When the $NO_x$ storage component comprises an alkali metal (or an oxide, a carbonate or a hydroxide thereof), then preferably the alkali metal is selected from the group consisting of potassium (K), sodium (Na), lithium (Li), caesium (Cs) and a combination of two or more thereof. It is preferred that the alkali metal is potassium (K), sodium (Na) or lithium (Li), more preferably the alkali metal is potassium (K) or sodium (Na), and most preferably the alkali metal is potassium (K).

When the $NO_x$ storage component comprises an alkaline earth metal (or an oxide, a carbonate or a hydroxide thereof), then preferably the alkaline earth metal is selected from the group consisting of magnesium (Mg), calcium (Ca), strontium (Sr), barium (Ba) and a combination of two or more thereof. It is preferred that the alkaline earth metal is calcium (Ca), strontium (Sr), or barium (Ba), more preferably strontium (Sr) or barium (Ba), and most preferably the alkaline earth metal is barium (Ba).

When the $NO_x$ storage component comprises a rare earth metal (or an oxide, a carbonate or a hydroxide thereof), then preferably the rare earth metal is selected from the group consisting of cerium (Ce), lanthanum (La), yttrium (Y), neodymium (Nd) and a combination thereof. More preferably, the rare earth metal is neodymium (Nd) or lanthanum (La).

Typically, the $NO_x$ storage component comprises, or consists essentially of, (i) an oxide, a carbonate or a hydroxide of a rare earth metal and/or (ii) an oxide, a carbonate or a hydroxide of an alkaline earth metal.

It is preferred that the $NO_x$ storage component comprises barium (Ba), lanthanum (La) or neodymium (Nd) (e.g. an oxide, a carbonate or a hydroxide of barium (Ba), lanthanum (La) or neodymium (Nd)).

Typically, the $NO_x$ storage component is disposed or supported on the support material. The $NO_x$ storage component may be disposed directly onto or is directly supported by the support material (e.g. there is no intervening support material between the $NO_x$ storage component and the support material).

The support material generally comprises, or consists essentially of, an oxide of aluminium, an oxide of magnesium and aluminium or an oxide of cerium.

When the support material comprises, or consists essentially of, an oxide of aluminium, then typically the support material comprises, or consists essentially of, alumina.

When the support material comprises, or consists essentially of, an oxide of magnesium and aluminium, then the support material may comprise a mixed oxide of magnesium oxide (MgO) and aluminium oxide ($Al_2O_3$). The mixed oxide of magnesium oxide (MgO) and aluminium oxide ($Al_2O_3$) may comprise, or consist essentially of, 1.0 to 40.0% by weight of the magnesium oxide (based on the total weight of the mixed oxide), such as 1.0 to 30.0% by weight, preferably 5.0 to 28.0% by weight (e.g. 5.0 to 25.0% by weight), more preferably 10.0 to 25.0% by weight of the magnesium oxide.

The mixed oxide of magnesium oxide (MgO) and aluminium oxide ($Al_2O_3$) is typically a homogeneous mixed oxide of magnesium oxide (MgO) and aluminium oxide ($Al_2O_3$). In a homogeneous mixed oxide, magnesium ions occupy the positions within the lattice of aluminium ions.

The NTC support material comprises, or consists essentially of, ceria, or a mixed or composite oxide of ceria, such as a ceria-zirconia.

When the support material comprises, or consists essentially of, an oxide of cerium, then typically the support material comprises, or consists essentially of, ceria. The support material may be ceria or ceria-zirconia. The ceria-zirconia may consist essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia. It is preferred that the support material is ceria (i.e. the support material consists of ceria).

The $NO_x$ storage material may further comprise a platinum group metal (PGM). The PGM may be selected from the group consisting of platinum, palladium, rhodium and a combination of any two or more thereof. Preferably, the PGM is selected from platinum, palladium and a combination of platinum and palladium.

When the $NO_x$ storage material comprises a PGM, then generally the PGM is disposed or supported on the support material. The PGM is preferably disposed directly onto or is directly supported by the support material (e.g. there is no intervening support material between the PGM and the support material).

Alternatively, the second or third catalytic region may be for oxidising hydrocarbons (HCs) and/or nitric oxide (NO) in the exhaust gas produced by the diesel engine (e.g. the second or third catalytic region is a diesel oxidation catalytic region or has diesel oxidation catalyst (DOC) activity).

When the second or third catalytic region is for oxidising hydrocarbons (HCs) and/or nitric oxide (NO) in the exhaust gas produced by the diesel engine, the second or third catalytic region comprises platinum (Pt) and a support material. It is particularly preferred that the second or third catalytic region comprises, or consists essentially of, platinum (Pt), manganese (Mn) and a support material. The second or third catalytic region is for oxidising hydrocarbons (HCs) and/or nitric oxide (NO) in the exhaust gas produced by the diesel engine The platinum (Pt) is typically disposed or supported on the support material. The platinum may be disposed directly onto or is directly supported by the support material (e.g. there is no intervening support material between the platinum and the support material). For example, platinum can be dispersed on the support material.

The second or third catalytic region may further comprise palladium, such as palladium disposed or supported on the support material. When the second or third catalytic region comprises palladium, then the ratio of platinum to palladium by total weight is generally 2:1 (e.g. Pt:Pd 1:0 to 2:1), more preferably 4:1 (e.g. Pt:Pd 1:0 to 4:1).

It is generally preferred that the second or third catalytic region is substantially free of palladium, particularly substantially free of palladium (Pd) disposed or supported on the support material. More preferably, the second or third catalytic region does not comprise palladium, particularly palladium disposed or supported on the support material. The presence of palladium, particularly in a large amount, in the second catalytic region can be detrimental to NO oxidation activity. The NO oxidising activity of palladium is generally poor under the typical usage conditions for a diesel oxidation catalyst. Also, any palladium that is present may react with some of the platinum that is present to form an alloy. This can also be detrimental to the NO oxidation activity of the second catalytic region because platinum-palladium alloys are not as active toward NO oxidation as platinum is by itself.

Generally, the second or third catalytic region comprises platinum (Pt) as the only platinum group metal and/or noble metal (as defined above).

The second or third catalytic region typically has a total loading of platinum of 5 to 300 g ft$^{-3}$. It is preferred that the second or third catalytic region has a total loading of platinum of 10 to 250 g ft$^{-3}$ (e.g. 75 to 175 g ft$^{-3}$), more preferably 15 to 200 g ft$^{-3}$ (e.g. 50 to 150 g ft$^{-3}$), still more preferably 20 to 150 g ft$^{-3}$.

It is preferable that a primary function of the second or third catalytic region is oxidising nitric oxide (NO) to nitrogen dioxide ($NO_2$). However, it is appreciated that in some embodiments of the oxidation catalyst, the second or third catalytic region will also oxidise some hydrocarbons (HCs) during use.

The second or third catalytic region may also comprise manganese (Mn). The manganese may be present in an elemental form or as an oxide. The second or third catalytic region typically comprises manganese or an oxide thereof.

The manganese (Mn) is typically disposed or supported on the support material. The manganese (Mn) may be disposed directly onto or is directly supported by the support material (e.g. there is no intervening support material between the Mn and the support material).

The second or third catalytic region typically has a total loading of manganese (Mn) of 5 to 500 g ft$^{-3}$. It is preferred that the second or third catalytic region has a total loading of manganese (Mn) of 10 to 250 g ft$^{-3}$ (e.g. 75 to 175 g ft$^{-3}$), more preferably 15 to 200 g ft$^{-3}$ (e.g. 50 to 150 g ft$^{-3}$), still more preferably 20 to 150 g ft$^{-3}$.

Typically, the second or third catalytic region comprises a ratio of Mn:Pt by weight of ≤5:1, more preferably <5:1.

In general, the second or third catalytic region comprises a ratio of Mn:Pt by weight of ≤0.2:1 (e.g. ≤0.5:1), more preferably >0.2:1 (e.g. >0.5:1).

The second or third catalytic region may comprise a ratio by total weight of manganese (Mn) to platinum of 5:1 to 0.2:1, such as 5:1 to 0.5:1 (e.g. 5:1 to 2:3 or 5:1 to 1:2), preferably 4.5:1 to 1:1 (e.g. 4:1 to 1.1:1), more preferably 4:1 to 1.5:1. The ratio of Mn:Pt by weight can be important in obtaining advantageous NO oxidation activity.

Typically, the support material comprises, or consists essentially of, a refractory oxide. The refractory oxide is typically selected from the group consisting of alumina, silica, titania, ceria and a mixed or composite oxide thereof, such as a mixed or composite oxide of two or more thereof. The refractory oxide can also be zirconia. Zirconia can also be a component of any of the mixed or composite oxides also containing alumina, silica, titania and/or ceria described hereinabove. For example, the refractory oxide may be selected from the group consisting of alumina, silica, titania, ceria, silica-alumina, titania-alumina, zirconia-alumina, ceria-alumina, titania-silica, zirconia-silica, zirconia-titania, ceria-zirconia and alumina-magnesium oxide. It is preferred that the refractory oxide is alumina, a mixed oxide of silica and alumina or a composite oxide of silica and alumina.

In general, when the support material, or the refractory oxide thereof, comprises or consists essentially of a mixed or composite oxide of silica and alumina, then preferably the mixed or composite oxide of alumina comprises at least 50 to 99% by weight of alumina, more preferably 70 to 95% by weight of alumina, even more preferably 75 to 90% by weight of alumina.

The support material, or the refractory oxide thereof, may optionally be doped (e.g. with a dopant). The dopant may be selected from the group consisting of zirconium (Zr), titanium (Ti), silicon (Si), yttrium (Y), lanthanum (La), praseodymium (Pr), samarium (Sm), neodymium (Nd) and an oxide thereof.

When the support material, or the refractory oxide thereof, is doped, the total amount of dopant is 0.25 to 5% by weight, preferably 0.5 to 3% by weight (e.g. about 1% by weight).

It is preferred that the support material, or the refractory oxide thereof, may comprise, or consist essentially of, alumina doped with silica. When the alumina is alumina doped with silica, then the alumina is doped with silica in a total amount of 0.5 to 45% by weight (i.e. % by weight of the alumina), preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight.

Typically, the second or third catalytic region comprises an amount of the support material of 0.1 to 4.5 g in$^{-3}$ (e.g. 0.25 to 4.0 g in$^{-3}$), preferably 0.5 to 3.0 g in$^{-3}$, more preferably 0.6 to 2.5 g in$^{-3}$ (e.g. 0.75 to 1.5 g in$^{-3}$).

In some applications, it may generally be preferable that the second or third catalytic region is substantially free of a hydrocarbon adsorbent material (as defined above), particularly a zeolite (as defined above). Thus, the second or third catalytic region may not comprise a hydrocarbon adsorbent material.

The oxidation catalyst of the invention comprises a substrate. The substrate typically has an inlet end and an outlet end.

In general, the substrate has a plurality of channels (e.g. for the exhaust gas to flow through). Generally, the substrate is a ceramic material or a metallic material.

It is preferred that the substrate is made or composed of cordierite ($SiO_2$—$Al_2O_3$—$MgO$), silicon carbide (SiC), Fe—Cr—Al alloy, Ni—Cr—Al alloy, or a stainless steel alloy.

Typically, the substrate is a monolith (also referred to herein as a substrate monolith). Such monoliths are well-known in the art.

The substrate monolith may be a flow-through monolith. Alternatively, the substrate may be a filtering monolith.

A flow-through monolith typically comprises a honeycomb monolith (e.g. a metal or ceramic honeycomb monolith) having a plurality of channels extending therethrough, which each channel is open at the inlet end and the outlet end.

A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure.

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

When the substrate is a wall-flow filter, then generally any reference to a "zone disposed at an inlet end of the substrate" refers to a zone disposed or supported on the substrate that is:
(a) nearer to an inlet end (e.g. open end) of an inlet channel of the substrate than the zone is to a closed end (e.g. blocked or plugged end) of the inlet channel, and/or
(b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:
(a) nearer to an outlet end (e.g. an open end) of an outlet channel of the substrate than the zone is to a closed end (e.g. blocked or plugged) of the outlet channel, and/or
(b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

In principle, the substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

The invention also provides an exhaust system. The exhaust system comprises the oxidation catalyst of the invention and optionally an emissions control device. The expression "emissions control device" as used herein refers to a device that is able to directly treat or remove the pollutant components from an exhaust gas, typically by passing the exhaust gas through a substrate having a material for treating the exhaust gas.

Typically, the exhaust system comprises an upstream (i.e. inlet) end having a conduit for coupling to an engine manifold. The exhaust system may further comprise a downstream (i.e. outlet) end having a tailpipe for venting exhaust gas to the atmosphere.

In the exhaust system of the invention, the inlet or upstream end of the oxidation catalyst is typically coupled to the upstream (i.e. inlet) end of the exhaust system, which has a conduit for coupling to an engine manifold.

Examples of an emissions control device include a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof. Such emissions control devices are all well known in the art. The term "selective catalytic reduction filter catalyst" as used herein includes a selective catalytic reduction formulation that has been coated onto a diesel particulate filter (SCR-DPF), which is known in the art.

Some of the aforementioned emissions control devices have filtering substrates. An emissions control device having a filtering substrate may be selected from the group consisting of a diesel particulate filter (DPF), a catalysed soot filter (CSF), and a selective catalytic reduction filter (SCRF™) catalyst.

It is preferred that the exhaust system comprises an emissions control device selected from the group consisting of a lean $NO_x$ trap (LNT), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

When the exhaust system of the invention comprises an SCR catalyst or an SCRF™ catalyst, then the exhaust system may further comprise an injector for injecting a nitrogenous reductant, such as ammonia, or an ammonia precursor, such as urea or ammonium formate, preferably urea, into exhaust gas downstream of the oxidation catalyst and upstream of the SCR catalyst or the SCRF™ catalyst. Such an injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas. Ammonia can also be generated by heating ammonium carbamate (a solid) and the ammonia generated can be injected into the exhaust gas.

Alternatively, or in addition to the injector, ammonia can be generated in situ (e.g. during rich regeneration of a LNT disposed upstream of the SCR catalyst or the SCRF™ catalyst). Thus, the exhaust system may further comprise an engine management means for enriching the exhaust gas with hydrocarbons.

The SCR catalyst or the SCRF™ catalyst may comprise a metal selected from the group consisting of at least one of Cu, Hf, La, Au, In, V, a lanthanide and a Group VIII transition metal (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and a mixed oxide of two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$).

It is particularly preferred that the SCR catalyst, the SCRF™ catalyst or a washcoat thereof comprises a molecular sieve, such as an aluminosilicate zeolite or a SAPO. The at least one molecular sieve can be a small, a medium or a large pore molecular sieve.

It is preferred that the SCR catalyst, the SCRF™ catalyst or a washcoat thereof comprises a molecular sieve that is an aluminosilicate zeolite (preferably a synthetic aluminosilicate zeolite), such as an aluminosilicate zeolite selected from the group consisting of AEI, ZSM-5, ZSM-20, ERI (including ZSM-34), mordenite, ferrierite, BEA (including Beta), Y, CHA, LEV (including Nu-3), MCM-22 and EU-1, preferably AEI or CHA.

The aluminosilicate zeolite preferably has a silica-to-alumina ratio of 10 to 50, such as 15 to 40.

In a first exhaust system embodiment, the exhaust system comprises the oxidation catalyst of the invention and a catalysed soot filter (CSF). The oxidation catalyst may comprise a second catalytic region having PNA, LNT and/or DOC activity. The oxidation catalyst is typically followed by (e.g. is upstream of) the catalysed soot filter (CSF). Thus, for example, an outlet of the oxidation catalyst is connected to an inlet of the catalysed soot filter.

A second exhaust system embodiment relates to an exhaust system comprising the oxidation catalyst of the invention, a catalysed soot filter (CSF) and a selective catalytic reduction (SCR) catalyst. The oxidation catalyst may comprise a second catalytic region having PNA, LNT and/or DOC activity. Such an arrangement is a preferred exhaust system for a light-duty diesel vehicle.

The oxidation catalyst is typically followed by (e.g. is upstream of) the catalysed soot filter (CSF). The catalysed soot filter is typically followed by (e.g. is upstream of) the selective catalytic reduction (SCR) catalyst. A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In a third exhaust system embodiment, the exhaust system comprises the oxidation catalyst of the invention, a selective catalytic reduction (SCR) catalyst and either a catalysed soot filter (CSF) or a diesel particulate filter (DPF). The oxidation catalyst may comprise a second catalytic region having PNA, LNT and/or DOC activity.

In the third exhaust system embodiment, the oxidation catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

A fourth exhaust system embodiment comprises the oxidation catalyst of the invention and a selective catalytic reduction filter (SCRF™) catalyst. The oxidation catalyst of the invention is typically followed by (e.g. is upstream of) the selective catalytic reduction filter (SCRF™) catalyst. The oxidation catalyst may comprise a second catalytic region having PNA, LNT and/or DOC activity.

A nitrogenous reductant injector may be arranged between the oxidation catalyst and the selective catalytic reduction filter (SCRF™) catalyst. Thus, the oxidation catalyst may be followed by (e.g. is upstream of) a nitrogenous reductant injector, and the nitrogenous reductant injector may be followed by (e.g. is upstream of) the selective catalytic reduction filter (SCRF™) catalyst.

When the exhaust system comprises a selective catalytic reduction (SCR) catalyst or a selective catalytic reduction filter (SCRF™) catalyst, such as in the second to fourth exhaust system embodiments described hereinabove, an ASC can be disposed downstream from the SCR catalyst or the SCRF™ catalyst (i.e. as a separate substrate monolith), or more preferably a zone on a downstream or trailing end of the substrate monolith comprising the SCR catalyst can be used as a support for the ASC.

In general, the exhaust system of the invention may comprise a hydrocarbon supply apparatus (e.g. for generating a rich exhaust gas), particularly when the second catalytic region of the oxidation catalyst has LNT activity. The hydrocarbon supply apparatus may be disposed upstream of the catalyst of the invention. The hydrocarbon supply apparatus is typically disposed downstream of the exhaust outlet of the diesel engine.

The hydrocarbon supply apparatus may be electronically coupled to an engine management system, which is configured to inject hydrocarbon into the exhaust gas for releasing NON (e.g. stored $NO_x$) from the catalyst.

The hydrocarbon supply apparatus may be an injector. The hydrocarbon supply apparatus or injector is suitable for injecting fuel into the exhaust gas.

Alternatively or in addition to the hydrocarbon supply apparatus, the diesel engine may comprise an engine management system (e.g. an engine control unit [ECU]). The engine management system is configured for in-cylinder injection of the hydrocarbon (e.g. fuel) for releasing $NO_x$ (e.g. stored $NO_x$) from the catalyst.

Generally, the engine management system is coupled to a sensor in the exhaust system, which monitors the status of the catalyst. Such a sensor may be disposed downstream of the catalyst. The sensor may monitor the NON composition of the exhaust gas at the outlet of the catalyst.

In general, the hydrocarbon is fuel, preferably diesel fuel.

Another aspect of the invention relates to a vehicle. The vehicle comprises a diesel engine. The diesel engine is coupled to an exhaust system of the invention.

It is preferred that the diesel engine is configured or adapted to run on fuel, preferably diesel fuel, comprises ≤50 ppm of sulfur, more preferably ≤15 ppm of sulfur, such as ≤10 ppm of sulfur, and even more preferably ≤5 ppm of sulfur.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

EXAMPLES

The invention will now be illustrated by the following non-limiting examples.

Examples 1 and 2

Preparation of Oxidation Catalysts

The oxidation catalysts shown in Table 2 were prepared by forming a slurry of alumina doped with silica (5% by weight) that had been milled to a d90 of less than 20 microns. A solution of bismuth nitrate was added to the slurry. Where iron is present, then a solution of iron (III) nitrate was added to the slurry. The slurry was stirred to homogenise and was then applied to the channels of the cordierite flow through monolith. The coating was dried at 100° C. and then calcined at 500° C. The loading of platinum for each of the examples was 62.2 g ft$^{-3}$ and the loading of the alumina doped with silica was 1.2 g in$^{-3}$. Further details of the composition of the coating for each oxidation catalyst is shown in Table 2 below.

Test Conditions

Core samples were taken from the catalysts of Examples. The cores were aged at 750° C. for 20 hours. The catalytic activity for all cores was determined using a synthetic gas bench catalytic activity test (SCAT). The aged cores were tested in a simulated exhaust gas mixture shown in Table 1. In each case the balance is nitrogen.

TABLE 1

| | |
|---|---|
| CO | 600 ppm |
| HC (as $C_3H_6$) | 500 ppm |
| NO | 200 ppm |
| $CO_2$ | 5% |
| $H_2O$ | 6% |
| $O_2$ | 10% |
| Space velocity | 70000/hour |

The oxidation activity for CO was determined by the light off temperature, where 50% conversion is achieved (T50). The SCAT results are shown in Table 2 below.

TABLE 2

| Example No. | Bi loading | | Group 8 metal | Group 8 metal loading | | % CO conversion (T50° C.) |
|---|---|---|---|---|---|---|
| | g ft$^{-3}$ | % wt | | g ft$^{-3}$ | % wt | |
| 1* | 35.3 | 1.7 | — | — | — | 139 |
| 2 | 35.3 | 1.7 | Fe | 20.7 | 1.0 | 132 |

*Comparative Example

The oxidation catalyst comprising bismuth and iron (Example 2) has a lower light-off temperature (T50° C.) for % CO conversion compared to an oxidation catalyst comprising bismuth as the only promoter (Example 1).

For the avoidance of any doubt, the entire content of any and all documents cited herein is incorporated by reference into the present application.

The invention claimed is:

1. An oxidation catalyst for oxidizing carbon monoxide in an exhaust gas produced by a diesel engine, which oxidation catalyst comprising a catalytic region and a flow-through monolith substrate, wherein the catalytic region comprises a catalytic material consisting:
   bismuth (Bi) or an oxide thereof disposed or supported on a support material;
   a Group 8 metal, which is iron or an oxide thereof disposed or supported on the support material;
   a platinum group metal (PGM) selected from the group consisting of (i) platinum (Pt), and (ii) platinum (Pt) and palladium (Pd) having a ratio by weight of platinum to palladium of 15:1 to 1.5:1 when the platinum group metal (PGM) is platinum and palladium;
   wherein the support material comprises alumina doped with silica.

2. An oxidation catalyst according to claim 1, wherein the catalytic material comprises a total loading of bismuth of 15 to 40 g ft$^{-3}$.

3. An oxidation catalyst according to claim 1, wherein the catalytic material comprises bismuth in an amount of 0.1 to 5.0% by weight of the support material.

4. An oxidation catalyst according to claim 1, wherein the catalytic material comprises a total loading of a Group 8 metal of 15 to 40 g ft$^{-3}$.

5. An oxidation catalyst according to claim 1, wherein the catalytic material comprises a Group 8 metal in a total amount of 0.1 to 5.0% by weight of the support material.

6. An oxidation catalyst according to claim 1, wherein the platinum group metal (PGM) is platinum (Pt).

7. An oxidation catalyst according to claim 1, wherein the catalytic region further comprises a hydrocarbon adsorbent material, which is a zeolite.

8. An oxidation catalyst according to claim 1, wherein the catalytic region is disposed on the substrate.

9. An oxidation catalyst according to claim 1, wherein the catalytic region is a first catalytic region and the oxidation catalyst further comprises a second catalytic region.

10. An oxidation catalyst according to claim 9, wherein the first catalytic region is a first catalytic layer and the second catalytic region is a second catalytic layer, and the first catalytic layer is disposed on the second catalytic layer.

11. An oxidation catalyst according to claim 9, wherein the first catalytic region is disposed on the second catalytic region.

12. An oxidation catalyst according to claim 11, wherein the second catalytic region is a second catalytic layer and the first catalytic region is a first catalytic zone, and wherein an entire length of the first catalytic zone is disposed on the second catalytic layer.

13. An oxidation catalyst according to claim 11, wherein the second catalytic region is a catalytic zone and the first catalytic region is a first catalytic zone or a first catalytic layer, and wherein the first catalytic zone or the first catalytic layer is disposed on the second catalytic zone.

14. An oxidation catalyst according to claim 9, wherein the second catalytic region, layer or zone has PNA activity and comprises a molecular sieve catalyst comprising a noble metal and a molecular sieve, wherein the molecular sieve contains the noble metal.

15. The oxidation catalyst according to claim 1, wherein the alumina doped with silica comprises silica in an amount of 0.5 to 15% by weight.

16. The oxidation catalyst according to claim 1, wherein the alumina doped with silica comprises silica in an amount of 1.0 to 10% by weight.

17. The oxidation catalyst according to claim 1, wherein the alumina doped with silica comprises silica in an amount of 2.5 to 7.5% by weight.

* * * * *